United States Patent [19]

Miwa et al.

[11] 4,225,967
[45] Sep. 30, 1980

[54] BROADCAST ACKNOWLEDGEMENT METHOD AND SYSTEM

[75] Inventors: Hirohide Miwa; Eiichi Shiratori, both of Kawasaki, Japan

[73] Assignee: Fujitsu Limited, Kawasaki, Japan

[21] Appl. No.: 867,883

[22] Filed: Jan. 9, 1978

[51] Int. Cl.³ .............................................. H04N 7/06
[52] U.S. Cl. ...................................... 455/68; 370/74
[58] Field of Search ..................... 325/47, 64; 358/84, 358/93, 142, 143, 147; 179/15 BP; 370/74; 455/68

[56] References Cited

U.S. PATENT DOCUMENTS

| | | | |
|---|---|---|---|
| 2,757,239 | 7/1956 | Patton | 179/15 |
| 3,140,468 | 7/1964 | Blaisdell et al. | 325/64 |
| 3,368,031 | 2/1968 | Eisele | 358/84 |
| 3,632,863 | 1/1972 | Hirashima | 358/142 |
| 3,760,275 | 9/1973 | Ohsawa et al. | 358/143 |
| 3,845,391 | 10/1974 | Crosby | 325/64 |
| 3,852,532 | 12/1974 | Giles et al. | 179/15 BP |
| 3,866,124 | 2/1975 | Wycoff | 325/64 |
| 3,939,419 | 2/1976 | Lindner | 325/37 |

*Primary Examiner*—Robert L. Griffin
*Assistant Examiner*—Joseph A. Orsino, Jr.
*Attorney, Agent, or Firm*—Staas & Halsey

[57] ABSTRACT

A broadcast acknowledgement method and system wherein a digital information signal, generated in order to indicate the content with regard to a present broadcast program (for example, a commercial broadcast program on television, radio or CATV), is superimposed on the voice signal of said program for broadcast and the composite signal transmitted to the receiving station, where it is processed to retrieve the digital information signal. Thereby, it can be confirmed whether or not the particular program has been broadcast or not. The method generally comprises the steps of removing the particular frequency band of the voice signal, generating the digital information signal by using some of the desired frequency signals within the particular frequency band of the voice signal, superimposing the digital information signal on the voice signal, transmitting the composite signal, extracting the digital information signal from the received signal at the receiving side, and processing the digital information signal so extracted to identify the particular program broadcast, and thus to obtain broadcast acknowledgement information such as sponsor's name, performers' name, time of broadcasting, etc. The broadcast acknowledgement system comprises, in several embodiments, a voice amplifier, band elimination filters, digital information generation circuit, various signal generators, and a mixing circuit; and, in another embodiment, a voice amplifier, band elimination filters, a digital information generation circuit, and a selector circuit.

24 Claims, 17 Drawing Figures

BROADCAST ACKNOWLEDGEMENT METHOD AND SYSTEM

BACKGROUND OF THE INVENTION

1. Field of the Invention

This invention relates to a broadcast acknowledgement method and system, and particularly, to a broadcast acknowledgement method and system suitable for the purpose of confirming whether or not a commercial program has been broadcast over the radio or televised.

2. Description of the Prior Art

Generally, in sponsored radio, television and CATV broadcasts, many commercial programs are presented. Such commercial programs are, for example, in the case of television broadcasting, televised at a specified time on a specified day on the basis of an agreement, signed by the broadcasting station and sponsor through the advertisement agents, concerning the broadcast time and content.

However, broadcasting of such commercial programs is very expensive and, in the case of television broadcasting, a sponsor must pay a large sum of money to the television broadcast station in charge of such broadcast for only 15 seconds of broadcast. In some cases, errors occur, and a commercial program other than the one intended is broadcast or televised, or the intended program is not broadcast or televised at all due to a mistake at the broadcasting station, signal interference, or broadcasting system down-time.

Thus, whereas a signed agreement may call for program A to be broadcast two times continuously at a specified time, such program may not be broadcast, or programs B and C may be broadcast instead due to a failure of the program editing system at the broadcasting station. In such a case, the specified commercial program is not broadcast in spite of the fact that a high on-air charge is paid, and the sponsor suffers a great deal of monetary damage. Thus, it is necessary for the broadcasting station to compensate the sponsor for the on-air charge as a result of breach of the agreement.

Under usual practice, the broadcast station, the sponsor and the advertisement agent arrange for monitoring the broadcast of commercial programs in each predetermined service area, in order to determine whether or not the commercial programs of concern are broadcast. In that manner, a judgment as to the necessity for compensation can be made. This manual method is lacking in accuracy and speed with which data for confirming the fact of broadcast can be obtained, and also has an inherent disadvantage in that the sponsor and broadcast station experience higher personnel expense and unnecessary inconvenience. For this reason, various methods and systems for automatically confirming the broadcast of commercial programs without the use of monitors have been proposed.

One such method and system involves the insertion of information for confirming the broadcast of commercial program (known as "acknowledgement signals") into the video signal track by superimposition of such an acknowledgement signal on the video signal. The confirming information consists of the sponsor's name, product name, and broadcast time. In such a system, the acknowledgement signals are in digital form, and a sub-carrier signal is inserted into the video signal in accordance with said digital information. Thereby, the commercial film is generated.

The latter method is not desirable because the influence of the sub-carrier signal, inserted in accordance with the digital information, appears on the CRT screen of the television receiver. Namely, CRT "flickers" appear, thus deteriorating the quality of the display image.

A second technique employs a method of inserting a frequency signal sequence in place of the voice signal of the commercial program during a short time $\Delta t$. Commercial program "start" and "end" signals are inserted into the sound track of the commercial film. According to the method, simultaneously, the voice signal at the specified position is removed for the time of $\Delta t$ with reference to the "start" signal inserting point, and a desired frequency signal from among the frequencies S1 to Sn of the audible frequency range is inserted in place of the removed voice signal. The inserted frequency signal is detected at the receiving side, and the broadcast of a particular commercial program can be confirmed by the frequency signal sequence.

Thus, by this technique, the frequency signals inserted in each time $\Delta t$ are considered as $f_1$, $f_2$, the insertion of signal $f_1$ indicating the data "1", and the insertion of signal $f_2$ indicating the data "0". These data "1" and "0" are inserted, respectively, as the particular broadcast information. However, this method has the disadvantage that the sound quality of the commercial program is deteriorated, and the television viewers experience inconvenience, since the voice signal of the commercial program is eliminated for the insertion time of $\Delta t$.

By a third existing method, the commercial program broadcast "start" and "end" signals are inserted into the sound track of the commercial film, or into the video signal recording (video track) or perforation part, and at least one particular frequency component, which is included in the commercial voice band frequency appearing in the period from "start" signal detection to "end" signal detection, is detected with a band-pass filter. Thereby, the pattern of the particular frequency signal component is obtained, and thus, the broadcast commercial program can be identified, that is, broadcast of the commercial program can be acknowledged.

This third method also has a disadvantage in that the system becomes large in size and complicated, and accurate identification is difficult since identification is performed as a function of the distribution of the particular frequency signal component. Moreover, in this method, it is impossible to insert the sponsor name, etc.

As described above, the existing methods have various disadvantages, and therefore, have still not been put into practical use. The advent of a method and system which allows insertion of various data, and which automatically and accurately acknowledges the broadcast of a commercial program without deterioration of the sound and image quality of the commercial program, has long been desired.

SUMMARY OF THE INVENTION

The present invention offers a method and system for acknowledging the broadcast of a commercial program, while eliminating the disadvantages of the existing methods outlined above.

More particularly, the inventive method of this application generally comprises the steps of removing the particular frequency band of the voice signal input, superimposing the digital information signal on the voice signal, transmitting the composite signal to a receiving side, extracting the digital information signal from the received signal at the receiving side, and processing the digital information signal so extracted to identify the particular program broadcast, and thus to obtain broadcast acknowledgement information such as the sponsor's name, performers' names, time of broadcasting, etc.

According to the further teaching of the invention, three embodiments of the inventive system for implementing the above-described method comprise a voice amplifier, one or more band elimination filters, a digital information generation circuit, various signal generators (including, in one embodiment, a pilot signal generator), a level detector circuit, a mixing circuit, a magnetic tape recording system, an optical recording system, and a transmitting system.

In accordance with the applicants' invention, a further embodiment of the transmitting side of the broadcast acknowledgement system comprises a voice amplifier, various band elimination filters, a digital information generation circuit, a selector circuit, a magnetic tape system, an optical recording system, and a transmitting system.

Finally, the various embodiments of the receiving side of the applicants' broadcast acknowledgement system generally comprise a receiver, amplifier, speaker, various band-pass filters, various rectifier/integrator circuits, a computer and a printing device (such as a typewriter).

It is an object of this invention to provide a system and method which acknowledge the fact of broadcast by eliminating a particular frequency band within the sound signal or sound track of the commercial program, and by simultaneously inserting a signal—having a specified frequency, amplitude or phase among the signals in said frequency band—into the sound signal based on digital information which serves to acknowledge the fact of broadcast, and by regenerating the digital information through detection of said signal at the receiving side.

It is another object of this invention to suppress deterioration of sound quality from the viewpoint of the human sense of hearing by means of band elimination in accordance with the relation of $\Delta f/f \leq K$ (constant), where the frequency band to be eliminated within the sound signal is considered as $\Delta f$ and the center frequency is considered as f. The phenomenon utilized in order to attain the above-mentioned object is the fact that the tone and level of a certain sound have a substantial influence on the monitor, even when the particular frequency band—in the frequency band of the sound signal transmitting human voice, music and natural sound, etc.—is eliminated to a certain extent.

It is another object of this invention to insert the specified frequency signal into the sound signal based on the digital information only when said sound signal level is higher than at least a specified level, and to maintain television viewers unaware of the inserted signal by means of a masking effect in relation to the human sense of hearing. The inserted signal is very weak and has little influence on the televiewers. But for further perfection, the digital information is inserted, in accordance with this invention, when the sound signal level is high.

It is a further object of this invention to simultaneously insert both a frequency signal based on the digital signal and a reference or pilot signal, to detect at the receiving side a signal having a frequency or amplitude difference and phase difference between the frequency signal and the reference signal, and thereby to regenerate the inserted digital information, and to acknowledge the broadcast of a commercial program. In accordance with this technique, wow and flutter resulting from fluctuation in motor speed at the time of recording the program in the commercial film, and fluctuation of the frequency, amplitude and phase differences due to attenuation, can be made small. As a result, the frequency band of the band-pass filter at the receiving side can be made narrower, while the signal-to-noise (S/N) ratio can be maintained large. The fact of broadcast can thus be acknowledged accurately. Moreover, since the frequency band to be eliminated can be narrowed, even in the case where many frequency signals f1, . . . , fn are inserted simultaneously, deterioration of sound quality can be prevented.

It is a further object of this invention to accommodate the sound signal in the dynamic range of the sound track when recording the sound signal in the sound track of the commercial film, and thereby to prevent generation of distortion and to maintain accurate detection of the inserted frequency signal.

It is still a further object of this invention to superimpose the digital information onto the sound signal without insertion of the frequency signal by blocking or passing the particular frequency band of the sound signal on the basis of the digital information for acknowledging the broadcast of the commercial program, and thereby to prevent deterioration of the sound quality.

It is an additional object of this invention to provide a system for automatically controlling a plurality of broadcast acknowledgement terminals with a central computer system so as to achieve remote acknowledgement of the fact of broadcast.

With the above and other objects in view that will hereinafter appear, the nature of the invention will be more clearly understood by reference to the following description, the appended claims, and the accompanying drawings.

DETAILED DESCRIPTION OF THE INVENTION

Figure 1:
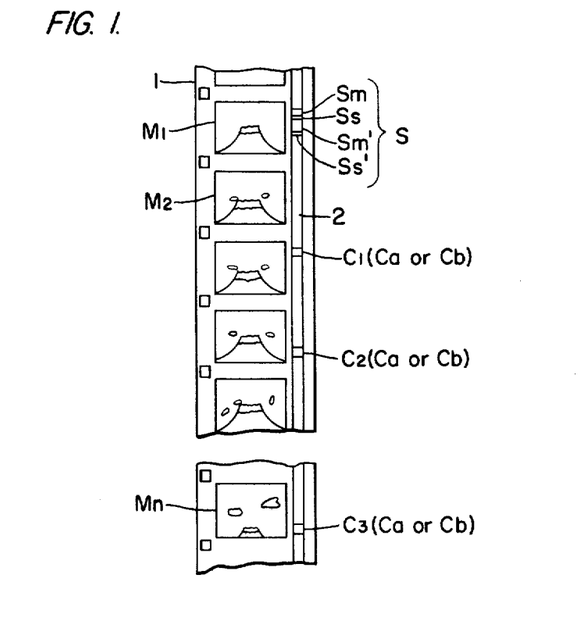
FIG. 1 is a diagrammatic representation of a partly omitted, well-known commercial film, recording a group of monitor signals.

FIG. 1 is a diagrammatic representation of a partly omitted, well-known commercial film recording a group of monitor signals for commercial program broadcast acknowledgement. In the frames M1 to Mn of the commercial film 1, picture signals of a particular commercial program are recorded and, in the sound track 2 provided along one side of these frames M1 to Mn, the sound signal related to the contents of said commercial program is recorded by an optical recording method.

At a specified position in the sound track 2 of said commercial film 1, a predetermined monitor signal for acknowledging broadcast is inserted and recorded, instead of the sound signal in said position. The monitor signal can be recorded after eliminating the previously recorded sound signal, or can be substituted for the sound signal at the same time that the sound signal would be recorded in the sound track.

Figure 2:
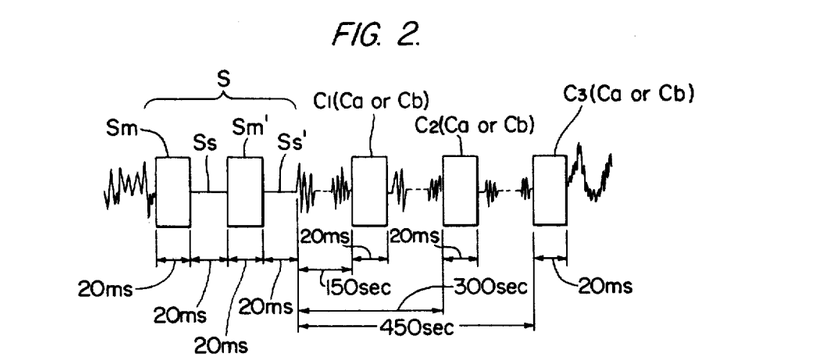
FIG. 2 is a diagrammatic representation of the recording relationship within the monitor signal group shown in FIG. 1.

With reference to FIG. 2, the monitor signal is composed of a commercial start signal S and a plurality of code signals C1 to C3 which are transmitted with some delay relative to this start signal S and with some deviation from the viewpoint of timing.

The start signal S has a pulse width of 80 msec and comprises a pair of mark time signals Sm and Sm' made up of a group of sine wave signals having a frequency of 1000 Hz. The start signal S also includes a pair of space time signals Ss and Ss', each with pulse width of 20 msec, one located between the mark time signals Sm and Sm', and the other after the succeeding mark time signal Sm'.

The code signals C1 to C3 are formed by inserting a signal of frequency 776 Hz and of pulse width 20 msec (signal Ca), or a sine wave of 1205 Hz (signal Cb), at time positions 150 sec, 300 sec and 450 sec, respectively, delayed with reference to the rear end of the succeeding space time signal Ss'. When the condition of insertion of the signal Ca is considered as logic "1", and when the condition of insertion of the signal Cb is considered as logic "0", a binary code system based on $2^3$ possible code combinations can be formed, and the information concerning the commercial program broadcast can be inserted in accordance therewith.

As explained above, the picture signal, the sound signal, and the monitor signal group (S, $C_1$, $C_2$, $C_3$) recorded in the commercial film 1 can be transmitted with a well-known transmitter to the service area as a television signal. However, this method causes inconvenience and annoyance to television viewers because of deterioration of the sound quality which results from elimination of the commercial sound for a certain amount of time (20 msec) each time one of the monitor signals is inserted.

Figure 3:
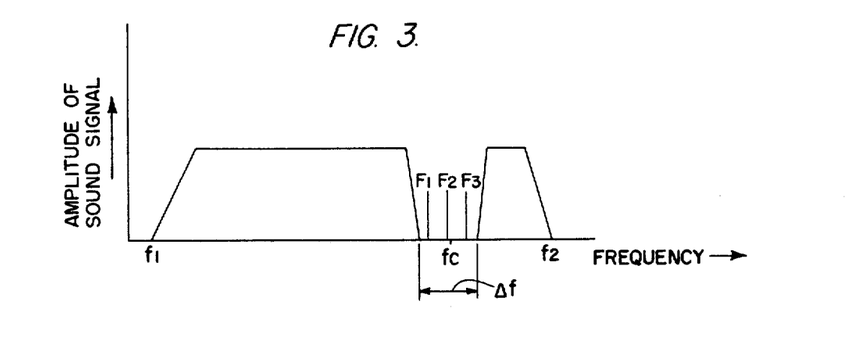
FIG. 3 is an amplitude-frequency plot used to describe a principle of the current invention.

FIG. 3 is an amplitude-frequency plot used to describe a principle of the invention. It is known that the sense of hearing is influenced to a greater extent by peaks in the intensity of the frequency spectrum of the sound signal, than by valleys contained therein. Deterioration of sound quality must be kept as small as can be ignored, even when the particular frequency band is eliminated. As shown in FIG. 3, the particular frequency band $\Delta f$ is eliminated in the sound signal frequency band of $f_1$-$f_2$, and digital information is transmitted by using desired frequencies $F_1$-$F_3$ within this frequency band $\Delta f$. Here, the term "sound signal" is understood to mean an electrical signal of the audible frequency band as concerns the human voice and music.

When the center frequency of the particular frequency band $\Delta f$ is considered as $f_c$, and if the relation $\Delta f/f_c < K$ (where K is some predetermined constant) is maintained, the sound quality is not deteriorated. When the frequency band in the higher band of sound frequency is eliminated, the relevant frequency band $\Delta f$ can be widened, and at the same time many signals can be inserted.

Figure 4A:
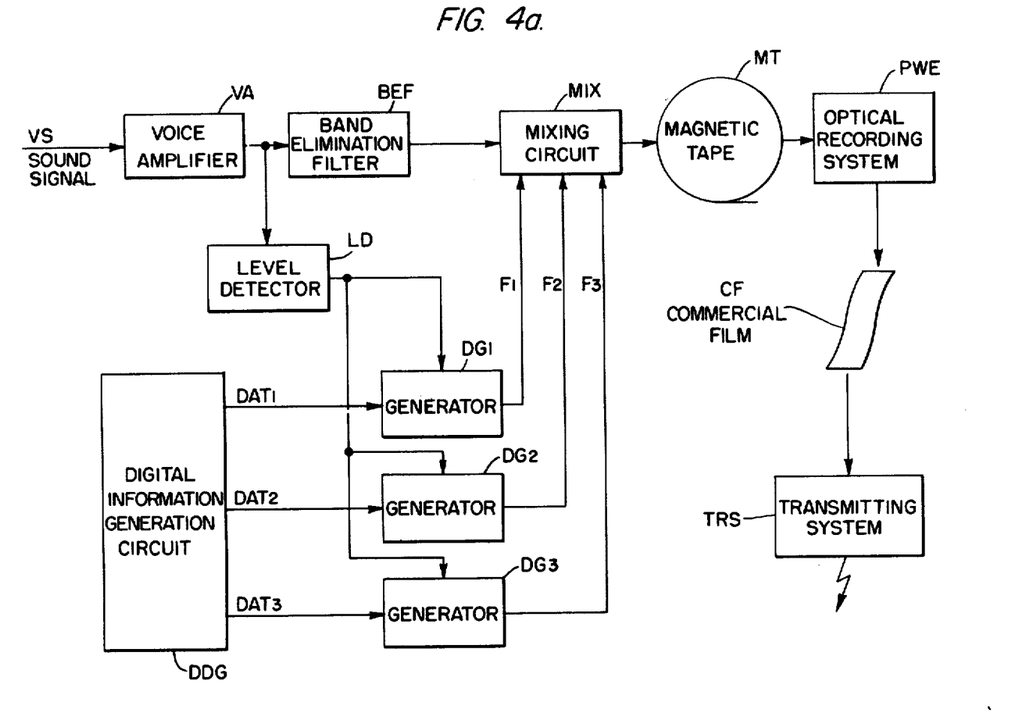
FIGS. 4(a) and (b) are block diagrams of an embodiment of the system of the invention.
Figure 4B:
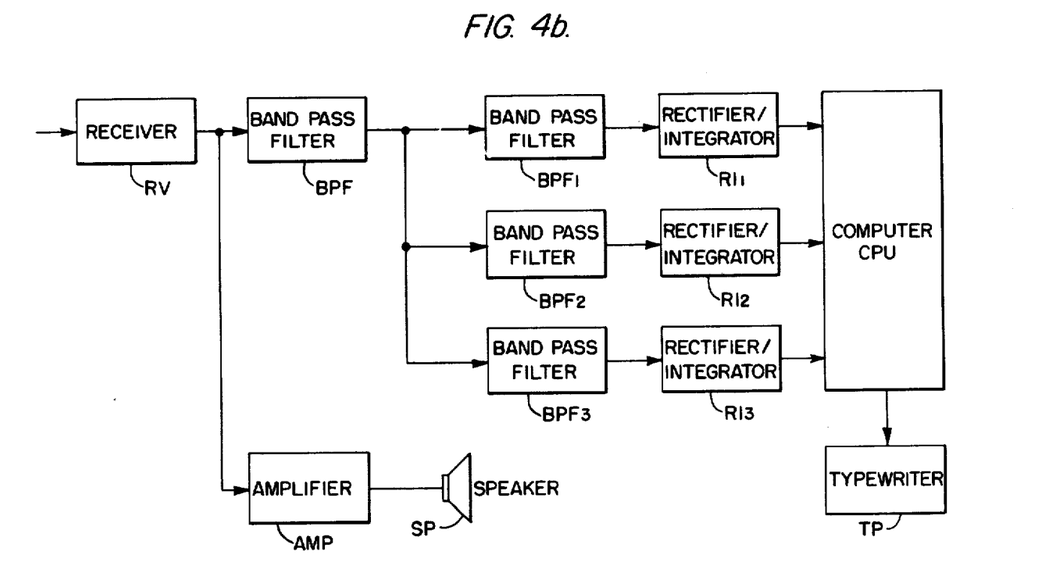

FIGS. 4(a) and (b) are block diagrams of an embodiment of the broadcast acknowledgement system based on the above-described principle of this invention as explained with reference to FIG. 3. FIG. 4(a) is a block diagram of the transmitting side of the system, while FIG. 4(b) is a block diagram of the receiving side of the system.

The sound signal or voice signal VS from a microphone (not illustrated) is amplified by the voice amplifier VA and then applied to the band elimination filter BEF. The particular frequency band $\Delta f$ (FIG. 3) is eliminated, and the voice signal VS is then applied to the mixing circuit MIX (FIG. 4(a)).

The digital data DAT1, DAT2 and DAT3—indicating the sponsor name, broadcasting time, product name, etc.—are applied, by the digital information generation circuit DDG, to the generators DG1, DG2 and DG3, respectively, which generate frequencies F1, F2 and F3, respectively, therefrom. Specifically, each generator DG1, DG2 and DG3 generates the frequency signals F1, F2 and F3, respectively, when the digital data DAT1, DAT2 and DAT3 are logic "1", and when the sound signal level (to be described later) is higher than a specified level.

For example, when the digital information sent from the digital information generating circuit DDG is the digital information DAT1 to DAT3 indicating the sponsor name as 1 0 1, and when the voice signal level is higher than the specified level, the generators DG1 and DG3 will respectively generate the signals having the frequencies F1 and F3. These signals F1 and F3 are input to the mixing circuit MIX and are superimposed on the voice signal, and specifically are inserted into the frequency band $\Delta f$ (FIG. 3) which has been subjected to band elimination.

The digital data generating circuit DDG then generates the digital data DAT1 to DAT3 indicating the broadcast time, after a lapse of specified time, as the logic "0", and superimposes the digital data onto the voice signal by insertion as in the case of the sponsor name.

Subsequently, in the same way, the digital data indicating the product name, etc., is also superimposed on the voice signal by insertion into the eliminated frequency band $\Delta f$.

In the above explanation, the number of parallel bits of the digital data generated from the digital data generating circuit DDG is shown to be three, and three kinds of frequency signals are accordingly inserted into the voice signal. However, the procedure is not limited only to the case of three types of data and three frequency signals. In order to actually superimpose all sponsor names, broadcast times and names of products, etc., onto the voice signal, more than three parallel bits and more than three kinds of frequency signals may be inserted, as required. It is also possible to provide additional bits which indicate whether the digital data superimposed and inserted is the sponsor name, broadcast time or product name. Furthermore, an oscillator may be provided, which oscillator oscillates with each bit. Moreover, it is also possible for the digital data to be serially generated bit-by-bit, and then serially inserted into the voice signal.

Returning to FIG. 4(a), voice signal level detector LD receives an output signal from the voice signal amplifier VA. This level detector LD detects whether the voice signal VS is higher or lower than the specified level, and it provides an enabling signal to each generator DG1 to DG3 when the level is higher than the specified level, and an inhibiting input signal when the level is lower than the specified level. The reason for requiring the digital data to be superimposed and inserted into the voice signal only when the voice signal level becomes higher than the specified level is as follows.

If the digital data is inserted into the voice signal when the voice signal level is lower than the specified level, the masking effect is weak, and an adverse influence of the inserted digital data on the voice signal appears. Namely, the television viewers or radio listeners recognize the inserted data as noise, and this causes inconvenience and annoyance. Therefore, according to the invention, the voice signal level detector LD has a level monitoring function and is connected to the amplifier VA for that purpose. When the input voice signal becomes lower than the specified level (OFF), a signal inhibiting output is sent to the generators DG1 to DG3, and thereby the frequency signals F1 to F3 based on the digital data are not inserted into the voice signal.

The voice signal (after amplification and filtering) and digital data (after conversion to frequencies F1-F3) are combined by the mixing circuit MIX, are recorded magnetically on magnetic tape $M_T$, and are then optically recorded on the sound track of the commercial film CF by means of a well-known optical recording system PWE. The commercial film CF is then carried into the transmitting station TRS, and broadcast at the specified time according to the contract.

With reference to FIG. 4(b), at the receiving side, the signal sent from the transmitting station is received by a known receiver RCV, amplified by amplifier AMP, and then provided as an audible output through the loud speaker SP. Thereby, the broadcast program can be heard without detection of the broadcast acknowledgement data or the elimination of the particular frequency band $\Delta f$ due to the characteristics of human sense of hearing. The weak signals F1, F2 and F3 are masked by the voice frequency components on the higher and lower side of them and are, as a result, reduced to such an extent as not to be able to be heard by the listeners.

BPF1 to BPF3 are band-pass filters having narrow frequency bands. These filters extract only the frequency component of F1-F3, respectively, and the extracted frequency signals are provided as an input to the rectifier/integrator circuits RI1 to RI3. The band-pass filtered signals are converted by rectifier/integrators RI1-RI3 into "1" and "0" signals, and then provided as a digital input to the computer CPU which has a decoding capability, among other things. The CPU discriminates the transmitted data, performs accumulation in the memory, and provides a printed output via typewriter TP. Transmission of the received, decoded data to other data collection centers can also be accomplished. By checking the printed output, it can be determined (acknowledged) whether or not the commercial program of the sponsor has been broadcast at the time specified in the contract.

Explained above is the case where the particular voice frequency band is eliminated, and some specified frequencies from the frequency band are inserted in accordance with the digital data. However, it is also possible to insert a specified phase signal or a specified amplitude signal into the frequency band signal, such being within the capabilities of one of ordinary skill in the art.

Figure 6:
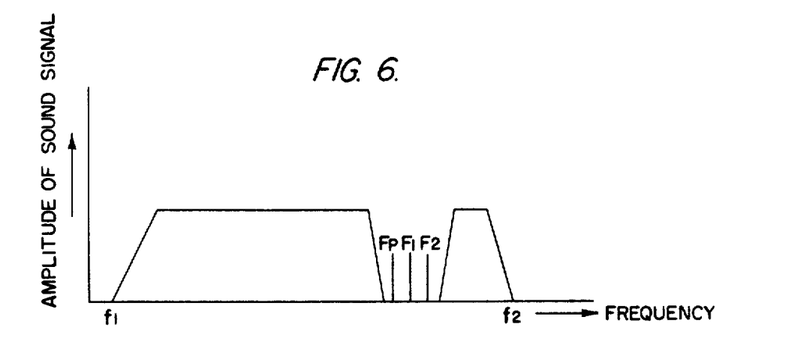
FIG. 6 is an amplitude-frequency plot used to describe an additional principle of the invention.

FIG. 6 is an amplitude-frequency plot used to describe an additional principle of the present invention, whereby a phase signal is inserted into the eliminated frequency band.

Figure 7A:
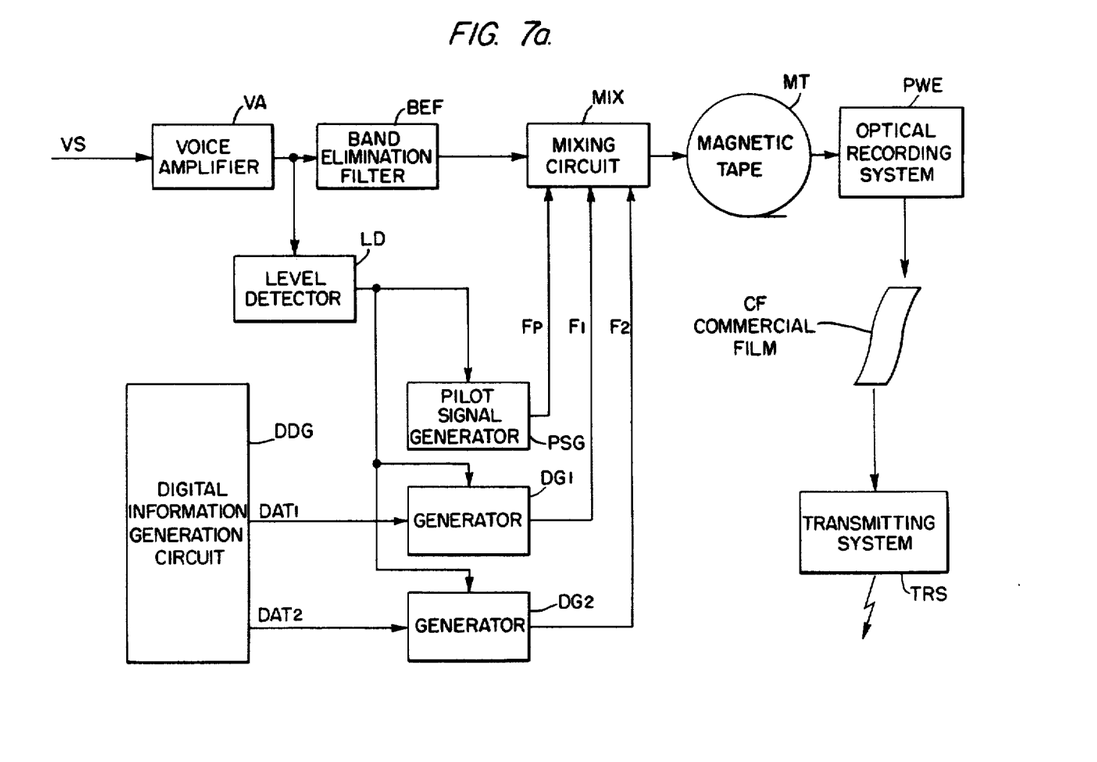
FIGS. 7(a) and (b) are block diagrams of a further embodiment of the invention.
Figure 7B:
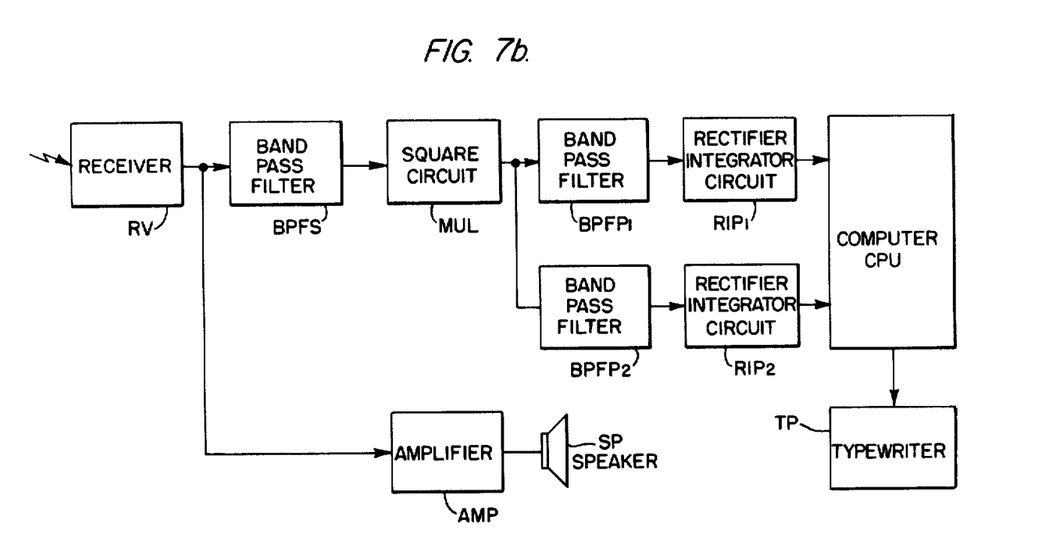

FIGS. 7(a) and (b) are block diagrams of another embodiment of the invention in accordance with the latter principle.

The broadcast acknowledgement system and method, explained with reference to FIGS. 3, 4(a) and 4(b), is certainly effective for solving the disadvantages presently being experienced in identifying and acknowledging particular programs in the radio, television and CATV broadcast as mentioned above. However, certain disadvantages exist. Specifically, as explained with respect to FIG. 4, the signals to be transmitted must be recorded in recording mediums such as movie film or magnetic tape. The magnetic tape driving system and optical film driving system employed usually generate speed fluctuation (namely, wow and flutter) at the time of recording and reproduction, and thereby the frequency signal (indicating the digital data) also changes. As a result, it is necessary to increase the frequency spacing of the inserted signal on the basis of the digital data in order to correctly reproduce the digital data signal at the receiver.

However, despite the above need to increase frequency spacing, the frequency band to be eliminated cannot be made too wide because the masking effect will become weak, allowing influence of the band elimination and sound quality to deteriorate, thus causing annoyance and inconvenience to the listeners. Because the frequency band to be eliminated has an upper limit, an increase in frequency spacing means that the number of frequency signals which can be inserted at a time is decreased, and the amount of data which can be transmitted is also decreased.

In addition, large fluctuation in the frequency of the inserted signal forcibly causes the passband of the band-pass filters BPF1-BPF3 at the receiving side (FIG. 4(b)) to be widened, resulting in further deterioration of the signal-to-noise (S/N) ratio and inaccurate data detection.

Figure 5:
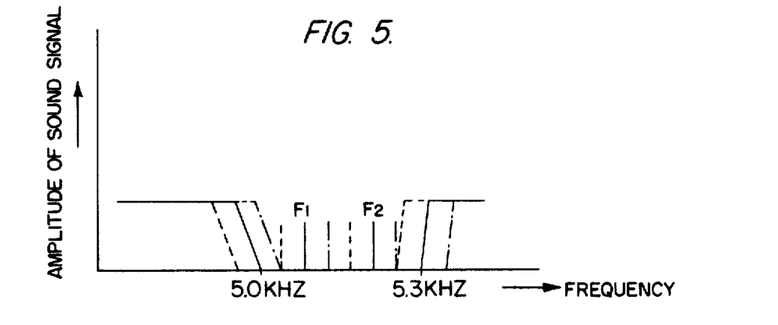
FIG. 5 is an amplitude-frequency plot used to describe the disadvantage of the embodiment shown in FIGS. 4(a) and (b)

FIG. 5 is am amplitude-frequency plot used to describe further the disadvantage of the embodiments of FIGS. 3, 4(a) and 4(b). When a voice signal is recorded onto a recording medium (such as movie film or magnetic tape, etc.) and then reproduced, the range of frequency fluctuation due to wow and flutter is proportional to the signal frequency. For example, when wow and flutter is 1% and the frequency band eliminated is 5.0 to 5.3 kHz, the variable frequency range for the frequency within this band becomes about 50 Hz, and at most two frequencies can be superimposed within this frequency band. In FIG. 5, the solid line indicates the case where there is no frequency fluctuation, the dashed line the case where there is a frequency change of −1%, and the dotted/dashed line the case where there is a frequency change of +1%.

To overcome the above problems, it is possible to insert a specified phase signal into the frequency band signal.

FIG. 6 is an amplitude-frequency plot used to describe an additional principle of the invention in the latter regard.

According to the further feature of this invention, the frequency band $\Delta f$ is eliminated from the frequency band of the voice signals f1-f2, as shown in FIG. 6, in order to remove the disadvantage explained with reference to FIG. 3, and then, the signals having the frequencies F1, F2 are inserted into said frequency band $\Delta f$ in accordance with the digital data signal; at the same time, a pilot signal $F_p$ is also inserted.

FIGS. 7(a) and (b) are block diagrams of an embodiment of the broadcast acknowledgement method and system for implementing the principle of this invention as described with reference to FIG. 6. FIG. 7(a) is a block diagram of the transmitting side of the system, while FIG. 7(b) is a block diagram of the receiving side of the system. Elements in FIGS. 7(a) and (b) corresponding to those in FIG. 4 are given the same reference numeral as in FIG. 4.

The block diagram of the transmitting side shown in FIG. 7(a) differs from FIG. 4 only in that the pilot signal generator PSG is provided in place of the signal generator DG3. The voice signal VS is amplified by the voice signal amplifier VA, applied to the band elimination filter BEF, and then applied to the mixing circuit MIX after the particular frequency band $\Delta f$ is eliminated by such filter as shown in FIG. 6. The pilot signal $F_p$ is generated by the pilot signal generator PSG and then applied to the mixing circuit. The digital data to be transmitted is coded into DAT1, DAT2 by the digital information generation circuit DDG, and controls the generators DG1, DG2 to ON and OFF conditions for generating/not generating the particular frequencies F1 and F2. The obtained frequency signals and pilot signal are applied to the mixing circuit MIX for mixing with the amplified and filtered voice signal.

The output of each mixing circuit MIX is a combination of the voice signal and the digital data as shown in FIG. 6, and these data are recorded sequentially onto the magnetic tap MT and, via the optical recording system PWE, on the optical commercial film CF. Thereafter, the signals are transmitted by the transmitting station TRS after modulation against a carrier.

With reference to FIG. 7(b), in the receiving side, the transmitted signal is received by the receiver RV, and demodulated therein, and only the signal within the frequency band $\Delta f$ is extracted through the band-pass filter BPFS. A signal having the frequency components F1-$F_p$ and F2-$F_p$ is generated via the square circuit MUL. The circuit MUL is not required to be an analog multiplier circuit or precise square circuit, it being possible to use an adequate non-linear circuit. The output of circuit MUL is applied to the band-pass filters BPFP1 and BPFP2, of which the center frequencies are F1-$F_p$ and F2-$F_p$, respectively, and the extracted frequencies F1-$F_p$ and F2-$F_p$ are applied to the rectifier/integrator circuits RIP1 and RIP2, respectively, for conversion into digital data signals, which are then applied to the computer CPU.

In the case of this embodiment of the invention, any frequency change due to wow and flutter generated via recording on the recording medium and reproduction by the optical recording system is very small since it is proportional to F1-$F_p$ and F2-$F_p$. The frequency band (for digital extraction) of the band-pass filters BPFP1 and BPFP2 can accordingly be narrowed, and the amount of data to be transmitted can correspondingly be increased drastically by making the frequency spacing smaller. Furthermore, deterioration of the S/N ratio can be prevented. However, since both a frequency difference between the frequency signals and a frequency difference with respect to the pilot signal are generated when the number of frequency signals has increased, the spacing of the frequency signals cannot be maintained constant. For example, with the pilot signal $F_p$ considered as 5.00 kHz and F1, F2, F3, F4 as 5.04, 5.08, 5.16 and 5.32 kHz, respectively, existence of the signals F1-F4 can be detected with band-pass filters BPFP1-BPFP4 of 0.04, 0.08, 0.16 and 0.32 kHz, respectively. In this case, the range of frequency change due to wow and flutter becomes about 1/1.25 to 1/1.6, as contrasted with that in the embodiment of FIGS. 3, 4(a) and (b), where frequencies are directly detected, and therefore, frequency can be detected sufficiently without error with the above-mentioned frequency spacing.

According to the principle of the invention, as described above with respect to FIG. 6, the adverse influence on the sound quality due to wow and flutter, generated during temporary recording onto the recording medium, can be decreased, and a digital data signal of comparatively large capacity can be superimposed on the voice signal frequency band.

In FIGS. 5, 6, 7(a) and 7(b), an explanation was made for the case wherein the desired number of frequency signals and the reference frequency signal are inserted at a time in accordance with the digital data, and wherein it is also possible to insert a signal having the reference phase or reference amplitude, as well as a signal having the specified phase difference or specified level difference from the reference phase or amplitude, in accordance with the digital data.

In the embodiments of FIGS. 4(a), 4(b) and FIGS. 6, 7(a), 7(b), the sound signal is recorded on the sound track of the commercial film CF, by the optical recording system by maintaining a certain sound level. However, the dynamic range of the sound track is as small as about 40 dB, and the sound signal is recorded in the non-linear part (described later) of the sound track if the sound level is not attenuated. When the signal thus recorded is reproduced, the actual sound provided as an output has some distortion. In other words, the voice amplitude is recorded in the sound track with some distortion. Harmonics due to the distortion are generated, and harmonic distortion is also generated within the frequency eliminated band wherein the digital data is inserted. When this distortion is particularly large, the sound signal is confused with the digital data. Thereby, detection of a very low-level signal becomes difficult, and acknowledgement of the broadcast of the commercial program becomes impossible.

Figure 8:
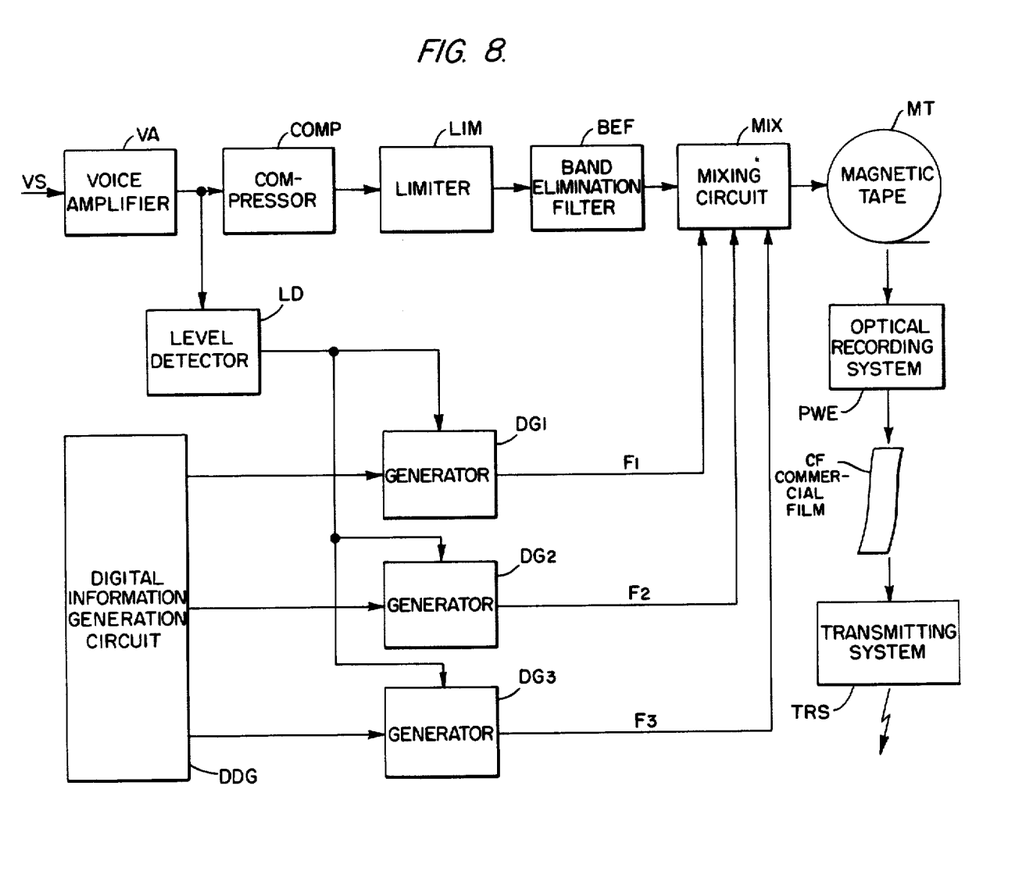
FIG. 8 is a block diagram of a further embodiment of the invention.

In response to this problem, it might be thought effective to decrease the sound level in order to lower the distortion, but it is not desirable to do that since the sound level of the broadcast also decreases. A further feature of the invention relates to a system and method for detecting a minute signal, without decreasing the sound level, by inserting a limiter and compressor into the embodiment of the inventive system. FIG. 8 is a block diagram of a broadcast acknowledgement system which can be adopted to overcome the above problems. Like reference characters have been maintained for like elements.

The embodiment of FIG. 8 removes the disadvantages explained with reference to FIGS. 4(a), 4(b) and FIGS. 7(a), 7(b), and ensures both a high sound level of commercial program and the detection of a minute signal.

With reference to FIG. 8, the voice signal VS from the microphone (not shown), after amplification in amplifier VA, is provided to the compressor COMP. The compressor may, for example, be an automatic voltage control circuit (AVC) and, when the amplitude of the voice signal becomes higher than the specified level, this circuit COMP automatically decreases the amplitude to a level lower than the specified one.

The compressor is not fast enough in response speed to perfectly control a large amplitude. The sound signal, having passed the compressor COMP, is then provided as an input to the limiter LIM and is subject to amplitude for limiting for the specified level or higher. Thereafter, the voice signal is provided as an output to the band elimination filter BEF.

The limiter LIM limits the maximum value of the output signal so that the voice signal amplitude may be optically recorded in the linear part of the sound track. As a result, the head of the voice amplitude is limited, but sufficient sound level can be recorded in the sound track.

The sound signal (after amplification, compression, limiting and filtering) and the commercial data (after conversion to frequency signals) are subsequently combined in the mixing circuit MIX, recorded on the magnetic tape MT, and then recorded, nby the optical recording system PWE, on the sound track of the commercial film CM. Since the output of mixing circuit MIX is subject to amplitude limiting, so that the signal is recorded in the linear part of the sound track by means of the compressor COMP and limiter LIM, the sound signal is recorded in said sound track without distortion. Namely, since distortion on the basis of the voice signal being recorded into the non-linear portion of the sound track is not generated, any distorted output in the eliminated frequency band is removed, and even a minute broadcast acknowledgement signal can be detected. Thus, accurate acknowledgement of commercial program broadcast can be realized.

Figure 9A:
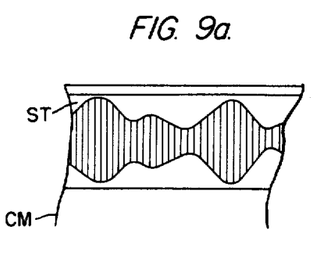
FIGS. 9(a)-(c) are graphical illustrations which explain the invention as shown in the embodiment of FIG. 8, wherein the recording condition and dynamic range of the sound track are shown.

FIGS. 9(a), (b) and (c) are graphical illustrations which explain the invention as shown in the embodiment of FIGS. 8(a) and (b), wherein the recording condition and dynamic range of the sound track are shown.

Figure 9B:
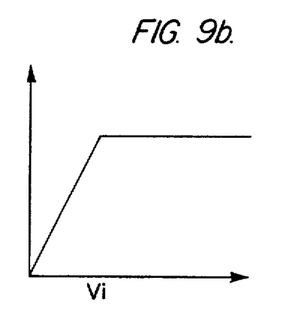

Specifically, FIG. 9(a) shows the condition of the sound signal when recorded without distortion. FIG. 9(b) shows the relationship (input/output characteristic) of the input voltage to the sound track and reproduction output voltage. From this figure, it can be understood that, when an input voltage becomes higher than Vi, the voice signal is recorded with a certain distortion.

Figure 9C:
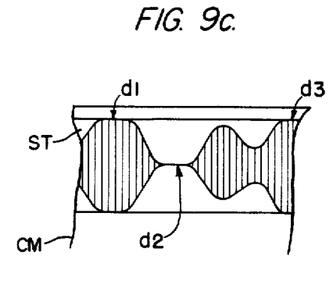

FIG. 9(c) shows the condition of the voice signal when such is optically recorded on the sound track of a commercial film, with distortion being shown at points d1, d2 and d3.

According to the embodiment of the system, as shown in FIGS. 8(a) and (b), in the case where the voice signal is recorded in the linear characteristic portion of the sound track, amplitude limiting is executed precedent to the compressor and limiter functions, band elimination is performed, and then a minute signal—such as a commercial program broadcast acknowledgement signal—is superimposed on said frequency band for the purpose of recording onto the sound track. Therefore, no distortion resulting from recording into the non-linear characteristic part is generated, and no distortion is generated within said frequency band. Thus, the minute signal of the commercial acknowledgement signal can be extracted easily at the time of reproduction, and thereby, the commercial broadcast can be acknowledged very accurately.

Figure 10:
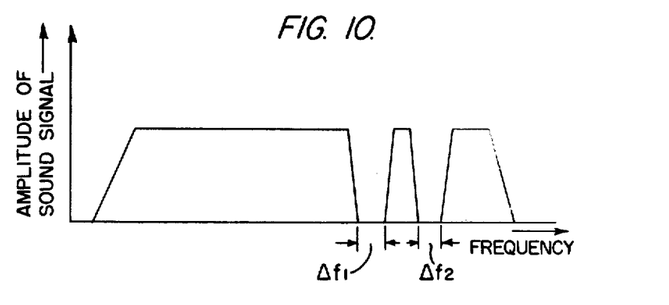
FIG. 10 is an amplitude-frequency plot used to describe a further principle of the invention.

FIG. 10 is an amplitude-frequency plot used to describe a further principle of the method and system of broadcast acknowledgement.

In the broadcast acknowledgement method and system described with reference to FIGS. 3, 4(a), 4(b) and FIGS. 6, 7(a), 7(b), the frequency band of the particular frequency of the voice signal is eliminated, and the frequency signals are inserted into such frequency band based on the digital data. The frequency signals inserted in accordance with this method are in reality noise but, in many cases, such signals are not detected as noise by the listeners due to the masking effect. However, in some cases, a person having very excellent sense of hearing may sense them as noise.

According to the method and system described with reference to FIG. 10, the desired frequency band in the voice frequency is blocked or allowed to pass in accordance with the digital data, and thereby, the digital data is inserted into the voice frequency signal. The frequency signal is not inserted in accordance with the digital data, and deterioration of sound quality can be prevented.

Now, when two frequencies are blocked or allowed to pass as shown in FIG. 10, four cases are possible: only $\Delta f_1$ is blocked; only $\Delta f_2$ is blocked; both frequencies $\Delta f_1$, $\Delta f_2$ are blocked; or both frequencies $\Delta f_1$ and $\Delta f_2$ are allowed to pass.

Figure 11A:
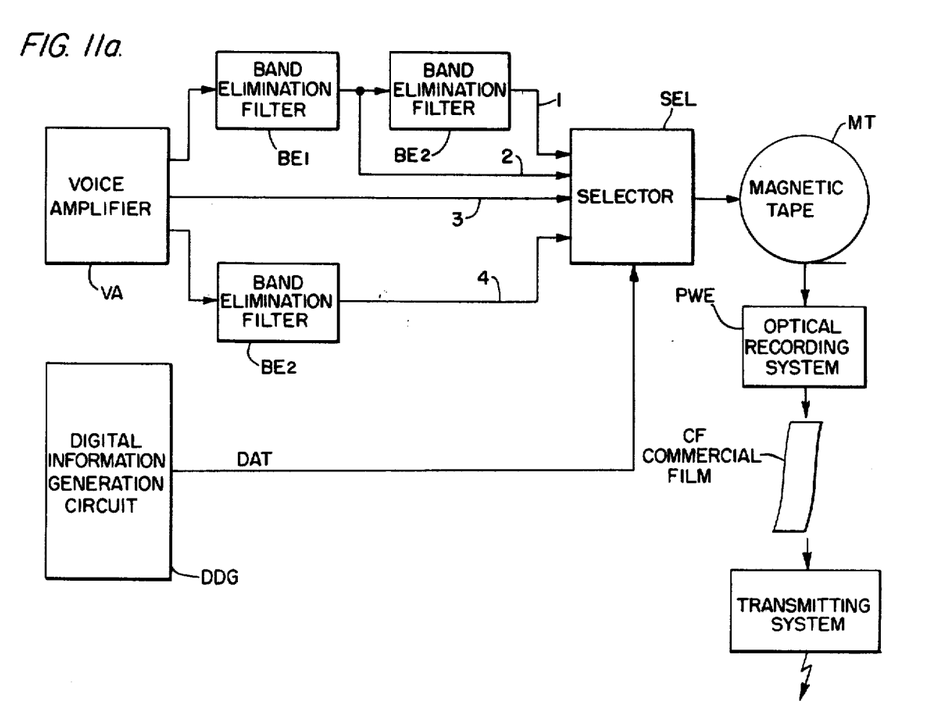
FIGS. 11(a)-(b) are block diagrams of an embodiment of the invention based on the plot of FIG. 10.
Figure 11B:
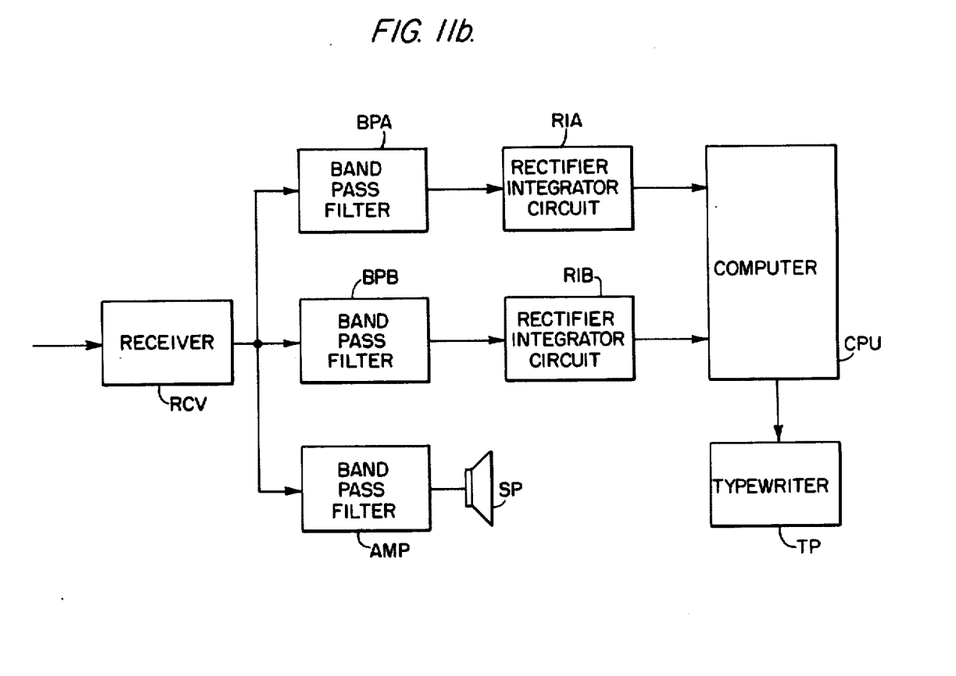

FIGS. 11(a), (b) are block diagrams of an embodiment of the invention based on the graphical plot of FIG. 10.

In FIG. 11(a), VA is a voice signal amplifier, and BE1, BE2 and BE2' are band elimination filters for the frequency bands $\Delta f_1$, $\Delta f_2$ and $\Delta f_2$, respectively. The sound signal VS is amplified by the amplifier VA and provided as a first input to the selector SEL. The sound signal VS, after having been converted to three other signals by the band elimination filters BE1, BE2 and BE2', is also provided to the selector SEL. Therefore, the four signals provided as inputs to selector SE2 are, with reference to FIG. 11(a), signals 1 ($\Delta f_1$, $\Delta f_2$ blocking), 2 (blocking of only $\Delta f_1$), 3 (original signal) and 4 (blocking of only $\Delta f_2$).

The digital data output, DAT, from the digital data generating circuit DDG is also provided as an input to the selector SEL. Thus, the signals 1–4 mentioned above are selected by the selector SEL on the basis of the digital data DAT, and the output is recorded to the magnetic tape MT. In the same manner as described with respect to FIGS. 4(a), (b) and 6, the sound signal forming the digital data is recorded, via optical recording system PWE, on commercial film CF, and is transmitted by the transmitting station TRS.

With reference to FIG. 11(b), at the receiving side, the transmitted signal is received by the receiving part RCV, and the voice signal is demodulated therein. The signals in the frequency bands of $\Delta f_1$ and $\Delta f_2$ are extracted via the band-pass filter BPA and BPB. The outputs of the filters are provided as inputs to the rectifier/integration circuits RIA and RIB, respectively, and existence of the digital signal is detected. The detected digital signal is applied to the computer CPR and processed therein. In the case of broadcast of a commercial program, existence of the signal can be detected by integrating for an adequate time if band elimination is not carried out.

The sound signal, after demodulation in the receiver RCV, is also amplified by the amplifier AMP, and then reproduced as sound through the loud speaker SP.

As explained above, in accordance with FIGS. 10, 11(a) and 11(b), the data signal is transmitted by utilizing the voice signal itself in order to superimpose digital data thereon, and to transmit the resulting signal. Therefore, deterioration of sound quality is very small, and the configuration is comparatively sample. With such advantages, this invention can be used for automatic identification and acknowledgement of program broadcasting.

Figure 12:
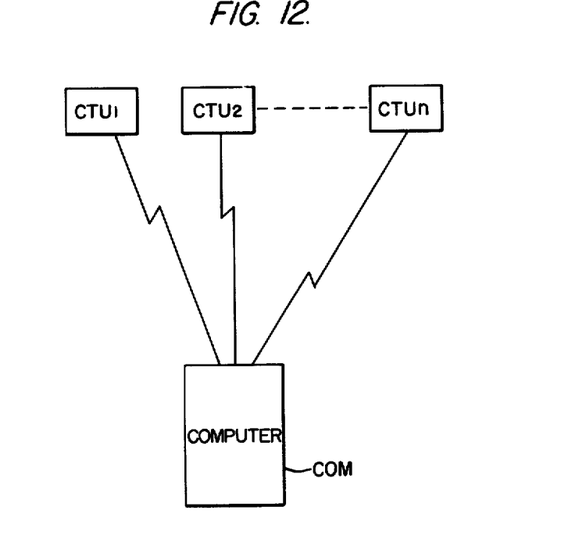
FIG. 12 is a block diagram of an embodiment of the invention for controlling a plurality of broadcast acknowledgement terminals with a central computer system.

FIG. 12 is a block diagram of an embodiment of the invention for controlling a plurality of broadcast acknowledgement terminals with a central computer system. In this figure, CTU1, CTU2, ... CTUn are broadcast acknowledgement terminals, and COM is a computer.

In such a case, as shown in FIG. 12, the acknowledgement terminals CTU1 to CTUn are installed in several broadcasting stations in the country, and the acknowledgement data in each service area is sent to the computer COM via the telephone lines. Thereby, the broadcast acknowledgement system can be formed, connecting the broadcast acknowledgement signals in each service area with an on-line base or host computer COM. By means of this centralized host computer system, the same sponsor—who has previously requested the broadcast of a desired commercial program on several broadcast stations—can obtain, from the central host computer, broadcast acknowledgement information relative to the broadcast of the desired commercial program.

While preferred forms and arrangements have been shown and illustrated in the invention above, it is to be clearly understood that various changes in detail and arrangement may be made without departing from the spirit and scope of this disclosure.

What is claimed is:

1. A broadcast acknowledgement method in which broadcast data relative to a broadcast program are transmitted along with a sound signal of given sound signal level and given frequency spectrum, comprising the steps of:
   (a) eliminating a particular frequency band from said given frequency spectrum of said sound signal;
   (b) generating, in accordance with said broadcast acknowledgement data, a desired number of frequency signals having frequencies ($F_1$, $F_2$ . . . ) within said eliminated particular frequency band;
   (c) generating a reference signal having a frequency ($F_p$) within said eliminated particular frequency band;
   (d) superimposing simultaneously said frequency signals and said reference frequency signal onto said sound signal to provide a communication signal for transmission;
   (e) transmitting said communication signal;
   (f) receiving said communication signal;
   (g) filtering said received communication signal to extract signals having frequencies within said eliminated particular frequency band;
   (h) generating a squared signal having frequency components $|F_1\text{-}F_p|$, $|F_2\text{-}F_p|$, . . . by squaring said filtered signals; and
   (i) filtering said squared signal to extract signals having respective frequency components $|F_1\text{-}F_p|$, $|F_2\text{-}F_p|$, . . . , whereby to obtain said broadcast data.

2. The method of claim 1, wherein said step (a) is carried out in accordance with the relation $\Delta f/f \leq k$ where $\Delta f$ is said particular frequency band eliminated, f is the center frequency thereof, and k is a predetermined constant.

3. The method of claim 1, wherein said frequency signals are superimposed onto said sound signal when said sound signal level is at least higher than a specified level.

4. The method of claim 1, comprising the additional step of recording said sound signal with superimposed frequency signals on a sound track, having a given dynamic range, of a film, in such a manner that the amplitude of said sound signal is kept within the dynamic range of the sound track of said film.

5. The method of claim 4, comprising the additional steps of compressing the sound signal so as to control the amplitude thereof, and amplitude-limiting the compressed sound signal.

6. The method of claim 5, comprising the additional steps of rectifying the filtered, received communication signal, and integrating the filtered and rectified received signal to extract said broadcast data therefrom.

7. The method of claim 1, comprising the additional step of detecting the level of the sound signal to produce a detection signal, said generating step (b) being conducted in accordance with said detection signal.

8. The method of claim 1, comprising the additional steps of compressing the sound signal so as to control the amplitude thereof, and amplitude-limiting the compressed sound signal.

9. The method of claim 1, comprising the additional steps of rectifying the filtered, received communication signal, and integrating the filtered and rectified received signal to extract said broadcast data therefrom.

10. A broadcast acknowledgement system for acknowledging the broadcast of a program, wherein broadcast data indicating information relative to said broadcast program are transmitted along with a sound signal of given sound signal level and given frequency spectrum, said system comprising, in combination:
   means for eliminating a particular frequency band from said given frequency spectrum of said sound signal;
   means for generating, in accordance with said broadcast acknowledgement data, a desired number of frequency signals having frequencies ($F_1$, $F_2$, . . ) within said eliminated particular frequency band;
   means for generating a reference signal having a frequency ($F_p$) within said eliminated particular frequency band;
   means for simultaneously superimposing frequency signals and said reference frequency signal onto said sound signal to provide a communication signal for transmission;
   means for transmitting said communication signal;
   means for receiving said communication signal;

means for filtering said received communication signal to extract signals having frequencies within said eliminated particular frequency band;

means for generating a squared signal having frequency components $|F_1-F_p|$, $|F_2-F_p|$, ... by squaring said filtered signals; and further means for filtering said squared signal to extract signals having respective frequency components $|F_1-F_p|$, $|F_2-F_p|$, ..., whereby to obtain said broadcast data.

11. The system of claim 10, wherein said eliminating means eliminates said particular frequency band from said frequency spectrum of said sound signal in accordance with the relation $\Delta f/f \leq k$ where $\Delta f$ is said particular frequency band eliminated, f is the center frequency thereof, and K is a predetermined constant.

12. The method of claim 10, wherein said superimposing means superimposes said frequency signals onto said sound signal only when said sound signal level is at least higher than a specified level.

13. The system of claim 10, additionally comprising means for detecting the level of the sound signal to produce a level-detection signal, said generating means being also responsive to said level detection signal for generating said desired number of frequency signals within said eliminated particular frequency band.

14. The system of claim 10, comprising means for compressing the sound signal to control the amplitude thereof, and means for amplitude-limiting said compressed sound signal, prior to provision to said eliminating means.

15. The system of claim 10, wherein said further means comprises means for rectifying the output signal from said filtering means to produce a rectified output, and means for integrating said rectified output to extract said broadcast data.

16. The system of claim 10, wherein said superimposing means comprises a mixing circuit.

17. The system of claim 10, wherein said filtering means comprises at least one band-pass filter responsive to said received communication signal for filtering same to recover said frequency signal superimposed on said sound signal.

18. The system of claim 10, comprising means for recording said sound signal with superimposed frequency signals on a sound track, having a given dynamic range, of a film in such a manner that the amplitude of said sound signal is kept within the dynamic range of said sound track of said film.

19. The system of claim 18, comprising means for compressing the sound signal to control the amplitude thereof, and means for amplitude-limiting said compressed sound signal, prior to provision to said eliminating means.

20. The system of claim 19, wherein said further means comprises means for rectifying the output signal from said filtering means to produce a rectified output, and means for integrating said rectified output to extract said broadcast data.

21. The system of claim 10, wherein said eliminating means comprises at least one band elimination filter.

22. The system of claim 21, wherein said generating means comprises a digital information generation circuit for generating digital signals comprising said broadcast data indicating information relative to said broadcast program, and at least one frequency generator responsive to said digital signals for generating said desired number of said frequency signals.

23. The system of claim 23, further comprising a pilot frequency generator circuit responsive to said digital signals for generating a pilot frequency signal, said superimposing means being also responsive to said pilot frequency signal to provide said communication signal for transmission.

24. A broadcast acknowledgement system for acknowledging the broadcast of a program, wherein broadcast data indicating information relative to said broadcast program are transmitted along with a sound signal of given sound signal level and given frequency spectrum, said system comprising, in combination:

means for eliminating a particular frequency band from said given frequency spectrum of said sound signal;

means for generating, in accordance with said broadcast acknowledgement data, a desired number of frequency signals within said eliminated particular frequency band;

means for superimposing said frequency signals onto said sound signal to provide a communication signal for transmission;

means for transmitting said communication signal;

means for receiving said communication signal;

means for filtering said received communication signal to recover said frequency signals superimposed on said sound signal; and means for processing said recovered frequency signals to extract said broadcast data therefrom;

wherein said generating means comprises a plurality of filters for blocking corresponding frequencies to provide frequency-blocked signals, said superimposing means comprising a selection circuit responsive to said frequency-blocked signals for selecting, in accordance with a predetermined sequence, particular ones of said frequency-blocked signals to provide said communication signal for transmission.

* * * * *